(12) United States Patent
Sehgal et al.

(10) Patent No.: US 12,362,580 B2
(45) Date of Patent: Jul. 15, 2025

(54) POWER SUPPLY AUTO ACTIVATE CIRCUIT

(71) Applicants: Anurag Sehgal, NEW Delhi (IN);
Naina Sehgal, New Delhi (IN)

(72) Inventors: Anurag Sehgal, NEW Delhi (IN);
Naina Sehgal, New Delhi (IN)

( * ) Notice: Subject to any disclaimer, the term of this patent is extended or adjusted under 35 U.S.C. 154(b) by 0 days.

(21) Appl. No.: 17/775,377

(22) PCT Filed: Mar. 30, 2021

(86) PCT No.: PCT/IB2021/052654
§ 371 (c)(1),
(2) Date: May 9, 2022

(87) PCT Pub. No.: WO2021/198925
PCT Pub. Date: Oct. 7, 2021

(65) Prior Publication Data
US 2023/0012338 A1 Jan. 12, 2023

(30) Foreign Application Priority Data
Mar. 30, 2020 (IN) .............................. 201911045305

(51) Int. Cl.
*H02J 7/02* (2016.01)
*H01H 36/00* (2006.01)
*H02J 7/00* (2006.01)
*H02J 9/06* (2006.01)

(52) U.S. Cl.
CPC ....... *H02J 7/0063* (2013.01); *H01H 36/0006* (2013.01); *H02J 7/0047* (2013.01); *H02J 9/061* (2013.01)

(58) Field of Classification Search
CPC ........ H02J 7/0063; H02J 7/0047; H02J 9/061; H02J 7/02; H02J 9/06; H01H 36/0006
USPC ......................................................... 307/18
See application file for complete search history.

(56) References Cited

U.S. PATENT DOCUMENTS

| | | | |
|---|---|---|---|
| 9,859,725 B2 | 1/2018 | Nowak et al. | |
| 2014/0049894 A1* | 2/2014 | Rihn ..................... | G06F 1/1616 335/219 |
| 2015/0123620 A1* | 5/2015 | Nowak ................ | H02J 7/0036 320/137 |

* cited by examiner

*Primary Examiner* — Elim Ortiz
*Assistant Examiner* — Xuan Ly

(57) ABSTRACT

The present invention provides a system utilizing a power supply auto-activate circuit for energizing power supply to activate various connected components. The present invention provides a system to enable automatic activation of the components inside an accommodating device.

11 Claims, 3 Drawing Sheets

//POWER SUPPLY AUTO ACTIVATE CIRCUIT

FIELD OF THE INVENTION

The present invention provides a system utilizing a power supply auto-activate circuit for energizing power supply to activate various connected components. More particularly, the present invention provides a system to enable automatic activation of the components inside an accommodating device.

BACKGROUND OF THE INVENTION

With advancement in technology, the use of electronic gadgets has exponentially increased. The electronic gadgets such as smart watches, fitness trackers, mobile phone, tablet laptop etc. are very frequently used. These electronic gadgets are such which totally run on integrated batteries, which are to be periodically charged as soon as their battery starts to die out. Although charging is not a problem if a person is at home as it can be put on charging on a power supply plug. However, charging these gadgets becomes a problem while travelling.

There are also a large number of electronic devices that do not have integrated batteries—like LED lights, alarms, motors etc.

The problem of powering or charging these electronic gadgets has been solved up to some level by power banks. Power banks are portable and rechargeable batteries that use circuitry to control any power in and power out. And, these power banks are used to power non-battery powered devices as well as further charge the battery-powered items like mobile phones etc. The power banks in general are switched manually or through the action of plugging in the cable of the electronic devices into the power bank that switches it on. Usually while travelling, people prefer to carry a bag wherein they can keep the handy stuff and gadgets they frequently use. While women carry handbags and purses, the men prefer to carry traditional briefcases or backpacks.

There are two main problems/constraints with commercially available power banks. The first problem or constraint is that when not in use, the power banks are required to be switched off for safety and power saving issues. Further, these power banks do take several hours to get fully charged hence allowing them to switch off for power saving becomes valuable. The second problem is that the power banks do not switch on automatically if a continuously connected device requires power. The power bank will only switch manually by pressing a button on the power bank or in the case a new device is plugged into the power bank. Hence it is not possible to switch on LED lights or charge the battery of a device like a GPS, if those electronic devices are continuously connected to the power bank. Due to the aforementioned drawbacks of power banks, travelling with electronic gadgets in a bag becomes inconvenient as they are unable to get supplied by power from the power bank.

U.S. Pat. No. 5,519,261A discloses a power management control system for battery powered devices. The invention provides method and apparatus for increasing the amount of power that may be extracted from a plurality of parallel connected battery banks by periodically effecting a switching between the banks for operative coupling to the power supply of an electronic or electrical device. The apparatus comprises at least two battery banks, a switching means, a microcontroller and a battery powered load. In this invention also the power bank is switched on only when the battery powered load is plugged in to the battery bank.

Therefore, there is need of a technology which can overcome drawbacks such as manual switching on and off the power bank or plugging in of electronic devices to switch on the power bank. This invention automatically activates a power bank that further powers directly connected devices like LED lights and Alarms as well as charges battery-powered devices like mobile phones and thus exhibits advantages such automatic power saving and compact design that can be conveniently carried along with multiple devices in an enclosure such as bags, rucksacks, pouches etc.

OBJECT OF THE INVENTION

The main object of the present invention is to provide a system utilizing a power supply auto-activate circuit for automatically powering up a power bank that energizes various components in a portable accommodating device like a bag.

Another object of the present invention is to provide a system to automatically energize and operate various components to perform various functions such as illumination, charging/discharging of the components such as smart phones, MP3 player, earphones or like.

Yet another object of the present invention is to provide a system for utilizing a power supply auto-activate circuit for automatically energizing the power supply to operate various components without any deliberate action of switching on the power supply and by allowing the power supply to energize the various devices by the simple action of opening the goods accommodating device like a bag.

Still another object of the present invention is to provide a system for utilizing the power supply auto-activate circuit comprising of at least one power supply device, at least one power receiving device, a power supply auto-activate circuit and a non-powered control device which is a magnet.

SUMMARY OF THE INVENTION

The present invention provides a system utilizing an auto-activate circuit for automatically energizing the power supply for operating various components inside the accommodating device.

In a main embodiment, the present invention provides a system comprising at least one power supply device, at least one power receiving or load device, an auto-activate circuit and a non-powered control device, a magnetic lock. The power supply device supplies power to the power receiving or load device through the auto-activate circuit and the magnetic lock acts as a triggering device in combination with the Reed switch. The auto-activate circuit comprises of at least one control circuit, a relay and a reed switch and works in proximity with the control device. The control device is a non-electrical, non-invasive device to control the auto-activate circuit. The power supply device is preferably a single or arrangement of power banks. The system is placed inside a goods accommodating device.

In yet another embodiment, the present invention provides a power supply auto-activate circuit comprising a control circuit, a reed switch, and if needed, also a relay switch. The auto-activate circuit and a control device preferably a magnetic lock is placed inside a goods accommodating device. When the accommodating device is opened, the magnetic lock on flaps of said device gets separated and the reed switch gets connected which further establishes a new electric connection of the control circuit and load device with the power bank. The power bank circuit considers this new connection by the reed switch as equivalent to a new device getting physically plugged into the power bank. The power bank thus switches on and energizes the control circuit and power receiving or load device having a circuit with any function that needs current. Once the reed switch powers on the circuit and in the event the accommodating device is closed and the magnetic lock is near the reed switch, the power supply is lost. At certain events, the power supply auto activate remains ON, even if the accommodating device is closed, for instance in the case of a theft alarm. To ensure that when the reed switch disconnects the power is discontinued, the power supply auto-activate circuit as per requirement activates the relay bypassing the reed switch. The controller based parallel arrangement of relay and reed switch is efficient to retain power when the auto-activate circuit needs to retain power and does not rely on the reed in case the magnetic lock disconnects the reed switch.

In still another embodiment, the present invention provides a control circuit comprising a power measuring unit, a power sensing unit and a power controlling unit. The power measuring unit measures the power received from the power bank and the power sensing unit senses the power consumption through a plurality of sensors and the power controlling unit controls the power from power supply device to power receiving device.

BRIEF DESCRIPTION OF THE DRAWINGS

The present invention will now be described with reference to the following drawings. The drawings and the associated descriptions are provided to illustrate embodiments of the invention and not to limit the scope of the invention.

DETAILED DESCRIPTION OF THE INVENTION

Figure 1:
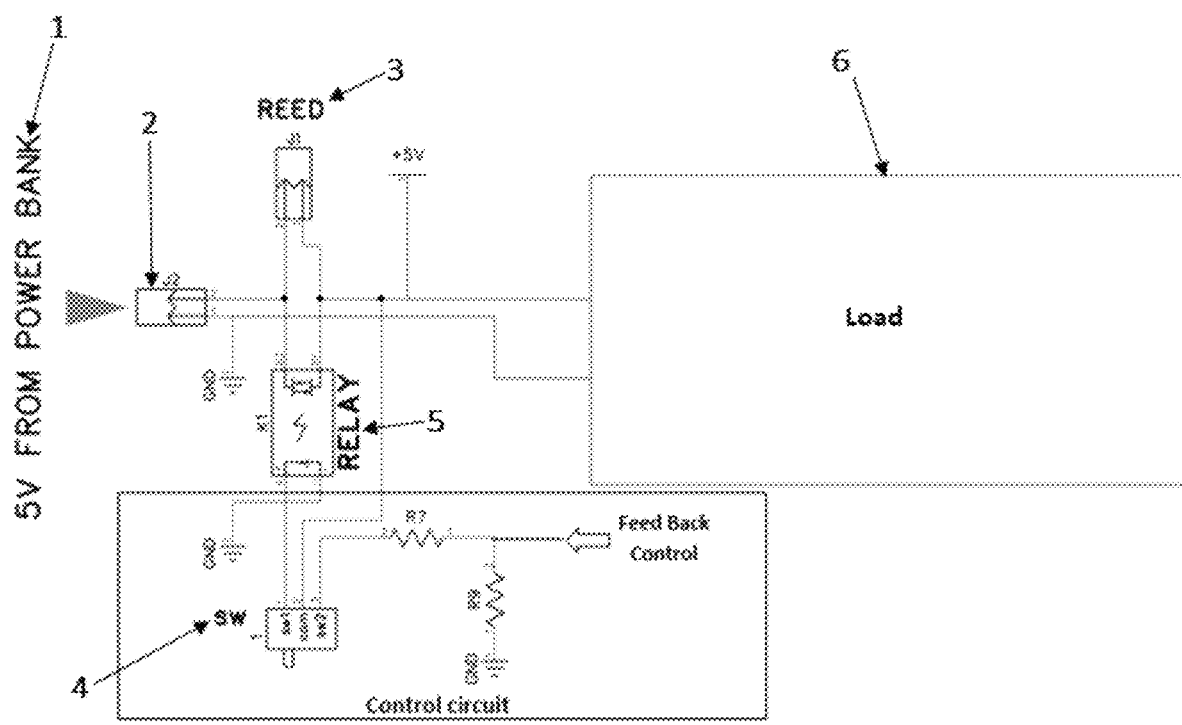
FIG. 1 shows a circuit diagram of the system utilizing a power supply auto-activate circuit in accordance with the present invention.

The present invention will now be described hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

In the most preferred embodiment, the present invention provides a system utilizing power supply auto-activate circuit comprises of at least one power supply device, at least one power receiving or load device, an auto-activate circuit and a control device preferably a magnetic lock. The power supply device supplies power to the power receiving or load device through the auto-activate circuit and the control device i.e. magnetic lock act as a triggering device. The auto-activate circuit comprises of at least one control circuit, and a reed switch, with an optional relay switch in the event power continuity is needed despite a disconnected reed switch. The power supply device is preferably a single or arrangement of power banks. The system is placed inside a goods accommodating device and said goods accommodating device is any enclosure to keep the various power receiving or load devices including but not limited to a bag, rucksack, boxes, portable domestic appliances, fashion items, pouches, carry bags and alike. The power receiving or load device include devices directly powered from the power bank including but not limited to devices such as lights, alarms, motors, solenoids as well as the battery powered gadgets like smartphone, earphones, GPS devices and alike.

In another preferred embodiment, the present invention provides a power supply auto-activate circuit comprising a control circuit, a reed switch and an optional relay switch required at an event when continuous power supply is needed despite the reed switch is disconnected. The auto-activate circuit and a magnetic lock is placed inside a goods accommodating device. When the accommodating device is opened, the magnetic lock on the opening of said device gets separated and the reed switch gets connected and sends the power signal to the power supply device to energize the control circuit. The control circuit in turn, controls and monitors the power consumption from the power bank and decides to activate a relay switch to create a parallel connection to the reed switch, in case it needs the power to continue even after the reed switch gets disconnected due to the magnetic lock.

In still another preferred embodiment, the present invention provides a control circuit comprising a power measuring unit, a power sensing unit and a power controlling unit. The power measuring unit measures the power received from the power bank and the power sensing unit senses the power consumption through a plurality of sensors and the power controlling unit controls the power from power supply device to power receiving device.

Referring to FIG. 1, shows a functional circuit diagram of the system utilizing the power supply auto-activate circuit. The system comprises of at least one power supply device (1), at least one power receiving or load device (6), an auto-activate circuit and a control device preferably a magnetic lock. The auto activate circuit comprising of at least one control circuit (4), a relay (5) and a reed switch (3), in parallel are connected to a power supply device (1) such as rechargeable battery/power bank through a connector (2). The power receiving or load device (6) is a battery powered device including but not limited to smart phones, earphones, MP3 player or alike. The control circuit (4) is configured to calculate the power consumption from power supply device (1) as soon as the load device (6) is energized.

Figure 2A:
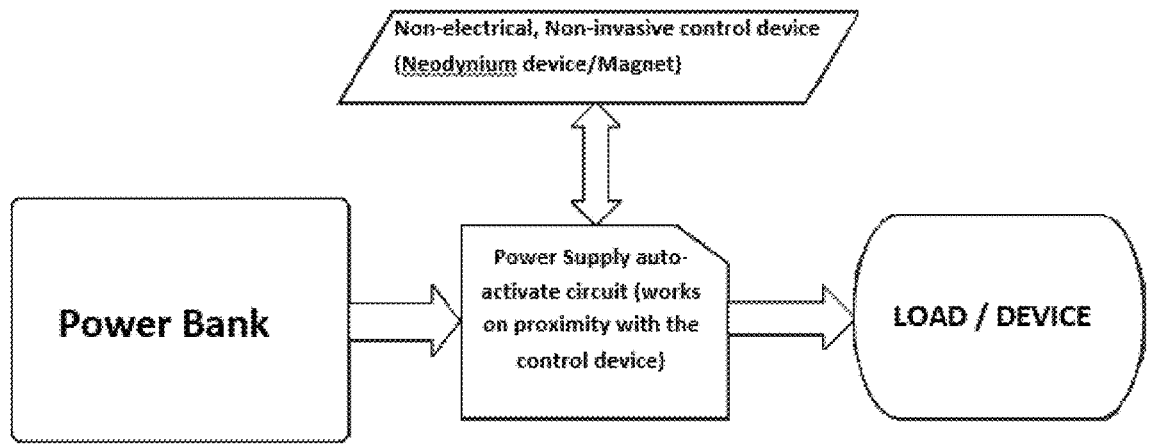
FIGS. 2(a) and 2(b) show functional block diagram of the system utilizing auto-activate circuit in accordance with the present invention.
Figure 2B:
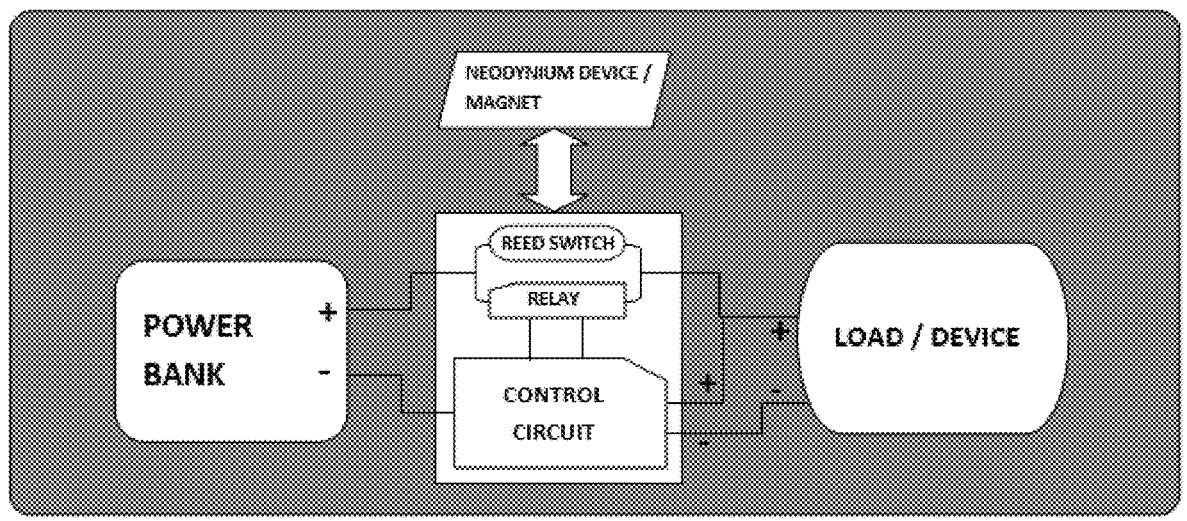

Referring to FIGS. 2(a) and 2(b), the block diagram of the system utilizing the power supply auto-activate circuit in a goods accommodating device is shown. The power flows from the power bank to the load via the auto-activate circuit. The process triggers as soon as the control device preferably a magnet gets attached or detached that leads to connection or disconnection of the circuit and this new connection activates the power bank as the power bank circuit recognizes the new connection made by the reed switch to be equivalent to a new device getting physically plugged into the power bank. The auto activate circuit comprises of at least one control circuit, a relay and a reed switch, in parallel, are connected to a power supply device as depicted in FIG. 2(b). The magnet when gets detached, energizes the reed switch subsequently energizing the control circuit hence transferring the power from the power supply device to the power receiving device. The control circuit optionally forms a parallel connection, by connecting the relay switch, in the event the current is needed and the reed switch is disconnected. The magnet when attached disconnects the reed switch hence disconnecting the transfer of power.

In another preferred embodiment, the control circuit also comprises of a power measurement unit, a power sensing unit, a power control unit. The power measurement unit measures the power communicated from the power supply device and power sensing unit detects the power consumption of the load through a plurality of sensors and the power control unit controls and monitors the power from power supply device to the power receiving device.

In all embodiments mentioned above, the portable accommodating device includes but is not limited to bags, purse, boxes, fashion items, portable home appliances etc.

Figure 3:
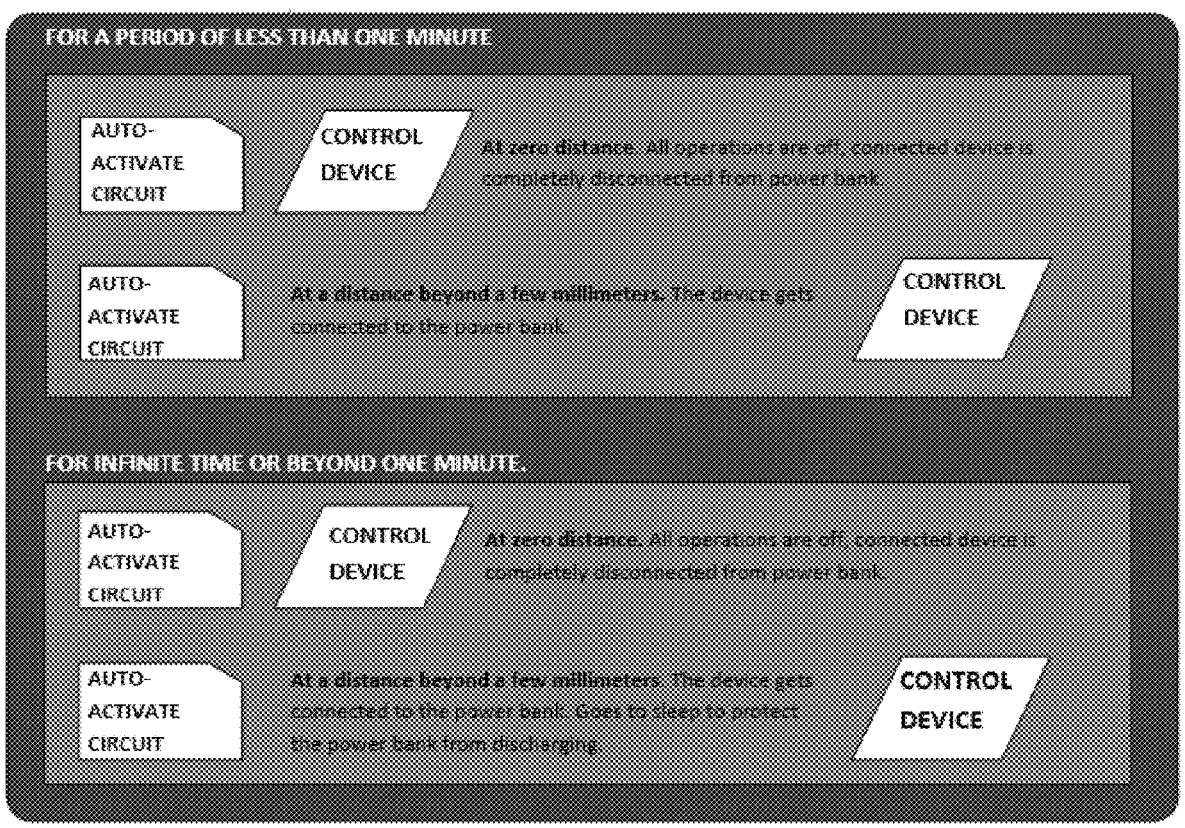
FIG. 3 shows a block diagram of switching scenarios in a system utilizing the power supply auto activate circuit in accordance with the present invention.

Referring to FIG. 3, a block diagram of switching scenarios in a system utilizing the power supply auto activate circuit is shown. The auto-activate circuit works in proximity with control device which is a non-electrical and non-invasive device. In one of the switching scenarios for a period of less than one minute, when the control device and the auto-activate device are at zero distance, all the operations are off and any load device connected is off being completely disconnected from the power bank. And, when the auto-activate circuit and the control device are at a distance beyond a few millimeters, the load devices are ON being connected to the power supply device preferably a power bank. In another switching scenario for an infinite time or beyond one minute, when the control device and the auto-activate device are at zero distance, all the operations are off and any load device connected is off being completely disconnected from the power bank. And, when the auto-activate circuit and the control device are at a distance beyond a few millimeters, the load devices may go to sleep if the power consumption is below a defined level to prevent the power bank from getting discharged. In the event, the load device is a battery powered device, like a mobile phone or a GPS device, then the load device gets fully charged and then stops drawing power from the power bank post which the power bank goes to sleep.

Example 1

Auto Activate Power Bank in a Hand Bag

The system utilizing power supply auto activate circuit is incorporated inside a bag. In the base of the bag, the power bank is placed to supply power to the power receiving or load device. The power receiving device includes but not limited to various components such as devices directly powered by the power bank like LED illumination lights and Alarm as well as battery powered devices such as smart phone, MP3 player, earphone placed inside the bag. When the bag is in open condition, the magnets affixed to the flap gets detached that triggers the reed switch. The reed switch gets connected and the power bank identifies this as a new load connection and gets activated that in turn supplies the power to the control circuit. Said circuit communicates the power to various components such as illumination unit, alarm, smart phone, MP3 player, earphones placed inside the bag. The illumination unit is preferably a plurality of low power LEDs that illuminate as soon as the bag is opened. In an event, when the bag is closed and the reed switch disconnects, the auto-activate circuit is also switched off. In another event after a predefined time, the power bank goes in sleep mode if the power consumption goes below a predefined level in order to prevent battery consumption.

If the alarm is activated and the controller needs to continue power even when the bag is closed and the reed gets disconnected, it activates the relay switch in parallel to the reed switch. The relay conventionally ensures connectivity of power till the control circuit decides to disconnect it. In the present invention when the alarm activates, the relay continues providing the power to the alarm till the user deliberately de-activates the alarm.

In the event the alarm is not active, when the bag is in closed condition, the magnets affixed to the flaps gets attached in turn opening the reed switch thus de-energizing the circuit. The directly powered devices like LED illumination stop drawing power from the power bank thus allowing the power bank to go into sleep mode. However, battery powered devices keep drawing power from the power bank, even when the bag is closed, till their own battery gets fully charged post which the power bank goes into sleep mode saving current.

Many modifications and other embodiments of the invention set forth herein will readily occur to one skilled in the art to which the invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:
1. A power supply auto-activate circuit comprising of:
   at least one control circuit;
   a relay switch; and
   a reed switch;
   wherein,
   said power supply auto-activate circuit works in proximity with a control device, said control device being a non-electrical, non-invasive magnetic lock;
   said power supply auto activate circuit is placed inside a goods accommodating device such that upon opening the goods accommodating device, the control device placed on flaps of said goods accommodating device activates the reed switch;
   said reed switch makes a new connection of the power supply device with the control circuit that turns on a power receiving or load device and monitors power consumption from said power receiving or load device and controls activation of said relay switch to produce a parallel connection to said reed switch, in case the power is needed even after said reed switch gets disconnected;

said relay and reed switch are independent to retain power in case said power supply auto-activate circuit needs to retain power; and said control circuit comprises of a power measurement unit for measuring the power communicated from the power supply device, a power sensing unit to detect power consumption of said power receiving or load device, a power control unit to control and monitor power from said power supply device to said power receiving device or load device.

2. The power supply auto-activate circuit as claimed in claim 1, wherein said power supply device includes a rechargeable battery, or a power bank connected through a connector.

3. The power supply auto-activate circuit as claimed in claim 1, wherein said power receiving or load device includes direct load devices including state of the art motors, solenoids, alarms, LED lights that draw power from the power supply device, or battery powered devices including smart phones, MP3 player, GPS devices or alike wherein the power supply device further charges the battery of the battery powered load device.

4. The power supply auto-activate circuit as claimed in claim 1, wherein said power sensing unit senses said power consumption through a plurality of sensors.

5. A system utilizing a power supply auto-activate circuit for automatically energizing comprising:
at-least one power supply device;
at least one power receiving or load device;
the power supply auto-activate circuit; and
a control device;
wherein,
said system is fitted in a goods accommodating device and automatically energizes goods kept in the said goods accommodating device;
said power supply device supplies power to said power receiving or load device through the power supply auto-activate circuit and said control device act as a triggering device;
said auto activate circuit comprises of at least one control circuit, a relay and a reed switch and works in proximity with said control device;

said reed switch makes a new connection of the power supply device with the control circuit in case said goods accommodating device is opened and said control circuit powers on said power receiving or load device; and said control circuit forms a parallel connection by connecting said relay switch, in case current is needed and said reed switch is disconnected;

said relay switch is activated bypassing said reed switch to ensure the power supply is discontinued in case said reed switch is disconnected;

said control device being a non-electrical, non-invasive magnetic lock; and said control circuit comprises of a power measurement unit for measuring the power communicated from said power supply device, a power sensing unit to detect power consumption of said power receiving or load device, a power control unit to control and monitor power from said power supply device to said power receiving device or load device.

6. The system as claimed in claim 5, wherein said goods accommodating device includes bags, purse, boxes, fashion items, portable home appliances.

7. The system as claimed in claim 5, wherein said power supply device includes rechargeable battery, power bank that is associated through a connector.

8. The system as claimed in claim 5, wherein said power receiving or load device includes smart phones, earphones, MP3 player or alike.

9. The system as claimed in claim 5, wherein said control device is activates a reed switch to establish a new connection with the power supply auto-activate circuit which further connects the load device or power receiving device.

10. The system as claimed in claim 5, wherein said system has multiple switching scenarios or modes.

11. The system as claimed in claim 5, wherein said power sensing unit senses the power consumption through a plurality of sensors.

* * * * *